April 14, 1964
C. F. DER
3,129,367
TRANSDUCER ULTRASONIC POWER SUPPLY
Filed May 31, 1961
2 Sheets-Sheet 1
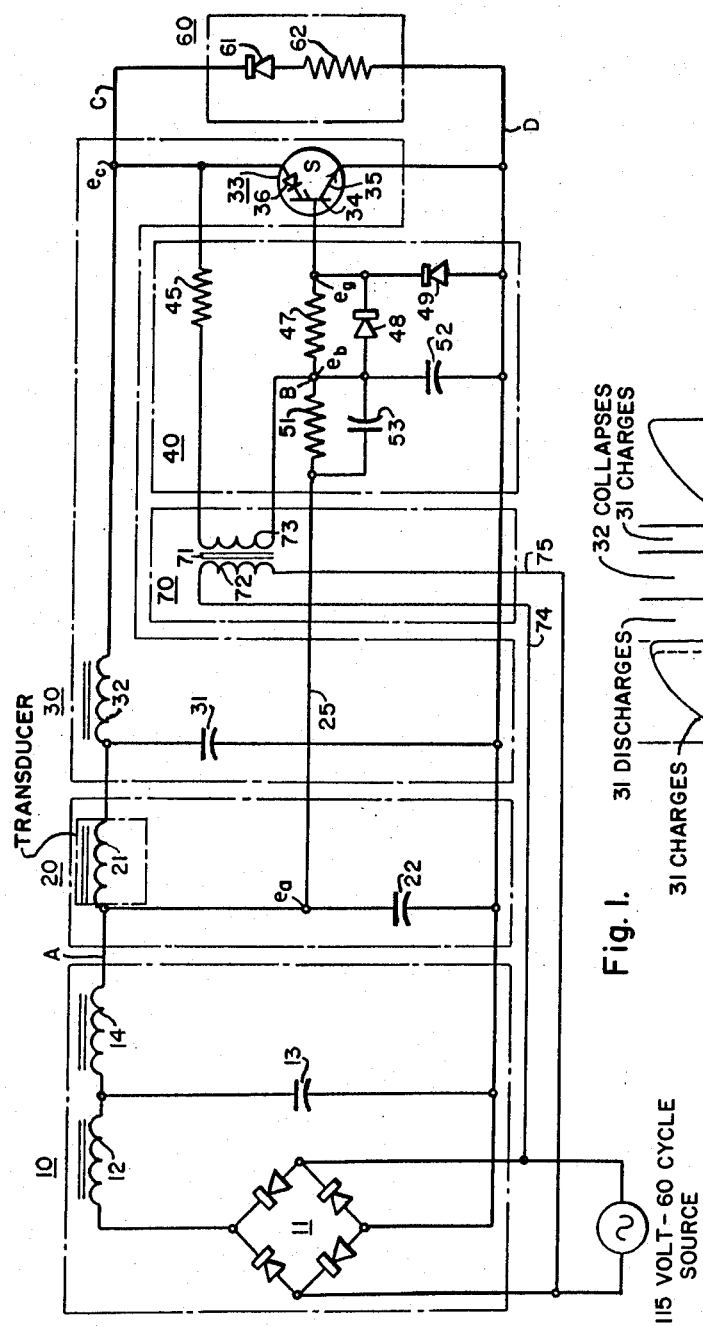
WITNESSES:
Leoy M. Garman
James F. Young
INVENTOR
Chuck F. Der
BY
ATTORNEY United States Patent Office 3,129,367
Patented Apr. 14, 1964

3,129,367
TRANSDUCER ULTRASONIC POWER SUPPLY
Chuck F. Der, Baltimore, Md., assignor to Westinghouse Electric Corporation, East Pittsburgh, Pa., a corporation of Pennsylvania
Filed May 31, 1961, Ser. No. 113,903
6 Claims. (Cl. 318—130)

This invention relates to an inverter and more particularly to an inverter or power supply for a vibrating electromechanical transducer.

In the patent application entitled Power Supply for Electro-Mechanical Vibrating Transducer, Serial No. 76,963, filed December 19, 1960, in the name of Warren C Fry, a power supply for an electromechanical vibrating transducer is disclosed. The embodiment of the invention disclosed therein responds to changes of the resonant frequency of the transducer to change the power supply frequency toward the new resonant frequency of the transducer so as to provide maximum power transfer to the transducer. This is accomplished by initially tuning the power supply to the natural frequency of the load or the electromechanical transducer. After this initial tuning the power supply will automatically track the resonant frequency of the load so as to maintain a maximum transfer of energy to the load. In the embodiment of the invention illustrated in the present application, a similar circuit is employed as in the above-mentioned patent application, however, additional elements and circuitry enable the unit to substantially track the resonant frequency of the load regardless of the initial setting of the frequency of the power supply or of changes of the natural frequency of the load.

Therefore it is an object of the invention to provide a power supply for an electromechanical vibrating transducer regardless of the initial frequency setting of the power supply.

Another object of the invention is the provision of a power supply for an electromechanical vibrating transducer which will track the resonant frequency of the vibrating transducer over a very wide range of frequencies of the resonant frequency of the transducer.

Other objects will be apparent from the following description taken in conjunction with the accompanying drawings, in which:

FIGURE 1 is a schematic diagram of an embodiment of the invention;

FIG. 2 illustrates waveforms occurring in the embodiment illustrated in FIG. 1.

Figure 3:
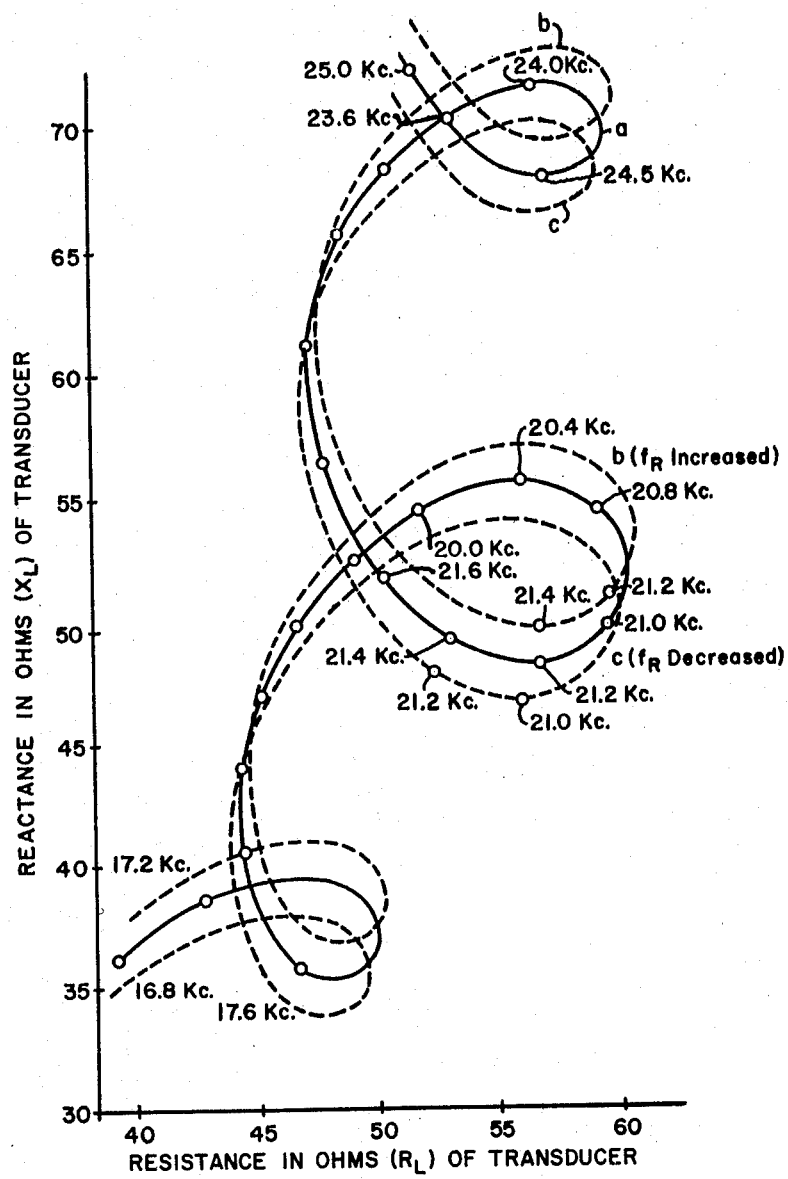
FIG. 3 is a graph useful in explaining the invention.

The description of the detailed operation and the values of the components of the circuit shown in FIG. 1 are set forth in the above-identified patent application. In the embodiment of the present invention, however, additional structure is added to the circuit which enables the unit to track a very wide range of frequencies regardless of the initial setting of the frequency of the power supply.

The circuit or the power supply as disclosed in the above application and as substantially set forth in FIG. 1, includes a source of constant current 10, a phase shifting network 20, a resonant charging network 30, and a switching and summing means 40. The network 30 includes a charging capacitor 31 and an inductor 32. Capacitor 31 is charged by the constant current source 10 and is discharged by a four layer, three terminal semiconductor switch 33 of the PNPN type having an anode 36 connected to the choke 32, a cathode 35 connected to the lower side of the charging capacitor 31 and a gate 34 which is connected to the cathode side of a diode 48.

The constant current source 10 includes a full wave rectifier 11 which is supplied with 115 volt alternating current, 60 cycle, and is filtered by a choke 12 and a capacitor 13. Another choke 14 prevents high frequency current feeding back to the constant current source. This constant current is supplied to the charging capacitor 31 to charge this charging capacitor at a predetermined rate, and to be discharged by the switch 33 when the four layer three terminal device 33 is rendered conductive by summing means 40. When the charging capacitor 31 discharges through the switch or controlled rectifier 33, a choke 32 of the LC network 30 receives this current and sets up a magnetic field until the rectifier 33 is rendered non-conductive. The collapse of the magnetic field across choke 32 establishes a reverse voltage across the rectifier 33.

Summing means 40 includes a clamp diode 49 connected between the gate 34 and the cathode 35 of controlled rectifier 33. A resistor 47 is connected across the diode 48 between the gate 34 and a reference point B. An integrating capacitor 52 is connected between the reference point B and the anode of diode 49 as well as to capacitors 31 and 22. A resistor 45 and the secondary 73 of a transformer 71 are connected between choke 32 and the reference point B. Additionally, a resistor 51 and a capacitor 53 are connected between reference point B on one side and a point of potential between capacitor 22 and a load coil 21 at the other side. The diode 61 and a resistor 62 are connected across the rectifier 33 so as to prevent high peak inverse voltage from damaging the four layer, three terminal switch 33.

The phase shifting network 20 includes, load inductor 21 which is the electromechanical vibrating transducer, and a power factor correcting condenser 22. The inductor 21 is of such a value that the voltage impressed across the charging capacitor 31 during the charging thereof by the constant current source 10, is applied across the load inductor 21 and the capacitor 22. As explained in detail in the above application, after several cycles of operation the voltage $e_a$ across the capacitor 22 will necessarily be out of phase with the voltage across the charging capacitor 31. Since this signal $e_a$ is employed to fire the rectifier 33, if its phase varies with respect to the voltage across the charging capacitor 31, the frequency of the power supply will change. The phase shifting network 20 includes the load inductor 21 and the capacitor 22, hence, any change in resonant frequency of the load inductor 21 results in a change in phase of the voltage $e_a$ which will effect a change in the frequency of the power supply toward the new resonant frequency of the inductor or the electromechanical vibrating transducer 21, so as to track the new frequency of the transducer.

Two feedback paths are added at reference point B across integrating capacitor 52 and when added to provide sufficient current through diode 48 will fire the rectifier 33 by a forward current through the gate 34. The first feedback is a portion of the trigger signal $e_a$ and the second feedback $e_c$ is through a resistor 45 in the secondary 73 of a transformer 71 to point B. When the sum of these two feedback voltages, $e_b$, is sufficiently high the diode 48 will conduct to provide a gate current to the gate 34 to fire the rectifier and discharge the charging capacitor 31. The operation will continue as a free running device.

Since the rectifier 33 represents a low impedance path to the discharging circuit when it is conducting, the feedback through the resistor 45 and winding 73, will always be positive or unipolar. More specifically, this feedback voltage will for all practical purposes never go negative a substantial amount. This feedback however, is added across capacitor 52 to a portion of the trigger voltage $e_a$ which is integrated through resistor 51 and capacitor 52. The effect of this trigger signal $e_a$ however will tend to make the point B go negative at certain times since it is out of phase with the feedback $e_c$. Hence, during the charging of the capacitor 31 the feedback through resistor 45 will tend to make point B go positive. As illustrated in FIG. 2, curve $a$ of the drawing, when the capacitor 31 is discharging through the rectifier 33, the feedback through the resistor 45 will provide little or no effect on the potential of point B. The feedback through resistor 45 is illustrated by 1 in curve $a$ of FIG. 2 and is illustrative of the feedback of the circuit as shown in the above-identified application.

A predetermined portion of the alternating current voltage $e_a$ is supplied to point B and is illustrated in curve $b$ of FIG. 2. The portion of the voltage of $e_a$ as shown in curve $b$ of FIG. 2 is across capacitor 52 with the feedback shown as 1 in curve $a$ of FIG. 2. As can be seen when the feedbacks are added to become sufficiently positive to render a sufficient amount of gate current through gate 34 and diode 48, the rectifier 33 will break over or fire and the charging capacitor 31 will discharge through the rectifier 33. Consequently, as shown in curve $a$ of FIG. 2, this will result or determine the trailing edge of the positive going pulse of the feedback through resistor 45 so that the feedback will return to substantially zero voltage. The feedback applied to point B through resistor 51 and capacitor 52 will then continue to go positive and become positive, so as to provide a 360° alternating current waveform which ends when the charging capacitor commences recharging by the constant current source so as to define the beginning of another cycle.

As pointed out in the above mentioned patent application, for optimum efficiency and power transfer it is necessary to have the frequency of the power supply at the resonant frequency of the vibrating transducer which is the inductor 21. The resonant frequency of the load can vary in various ways such as a change in water level of the vibrating tank of an ultrasonic cleaner or by a change in mass of devices being cleaned in the tank. FIG. 3 illustrates several characteristic curves of an inductive magnetostrictive transducer disclosed in U.S. patent application Serial No. 722,817 by E. B. Wright entitled "Electrical Transducer Apparatus," filed March 20, 1958. As stated in the above case, Serial No. 76,963, if the transducer were capacitive the curve would be similar but would be inverted. If the transducer were capacitive; that is, the reactance element 21 being a capacitor, the capacitor 22 would be replaced by an appropriately valued coil or inductor. As shown in FIG. 3, curve $a$, the transducer has three resonant loops with the main resonant frequency of the large loop being 21.2 kilocycles. The particular transducer which this characteristic curve represents would have a reactance of approximately 49 ohms and a resistance of approximately 56 ohms when the frequency of generator is 21.2 kc. These reactances are the electrical values which will be reflected by the inductor 21 into the phase network 20.

If the main resonant frequency of the transducer increases to, for example, 21.4 kilocycles a new characteristic curve identified as curve $b$ in FIG. 3 will be the characteristic curve of the transducer. This will result in an increase of about 4 ohms of the equivalent resistance which the inductor 21 displays to the power supply at a frequency of 21.2 kc. By increasing this resistance the phase of the trigger signal $e_a$ will be changed so that the power supply shown in FIG. 1, will increase its initial frequency due to this change of the phase of the trigger signal $e_a$. That is, when the resonant frequencies of the transducer increase the increase of resistance of the transducer will change the frequency of the power supply to increase this frequency so as to approach the resonant frequency of the transducer and thereby provide optimum efficiency and power transfer.

In the embodiment of the invention shown in FIG. 1, a feedback control 70 is employed. This feedback control includes a transformer 71 having a primary 72 and a secondary 73. The primary of the transformer has two input leads 74 and 75 which are connected to the source of 115 volt alternating current 60 cycles. The secondary 73 is connected in the feedback circuit between resistor 45 and reference point B. The winding 73 provides a very high impedance to a signal having a frequency approximately equal to the frequency of the power supply, that is approximately 20,000 cycles, so that the feedback to point B through this feedback circuit is substantially direct current. By applying a low frequency signal to the primary 72 of transformer 71 the low frequency signal or voltage across winding 73, will be effective to vary the D.C. level applied to point B through resistor 45 and secondary coil 73. This 60 cycle change or low frequency change of the D.C. level to point B will be added to a portion of signal $e_a$ to determine the firing of the rectifier 33. By varying the D.C. level of $e_b$ at a 60 cycle rate this feedback through secondary 73 will tend to make the power supply vary its frequency over a wide band of frequencies.

As shown in FIG. 2 the voltage across the rectifier 33 is as illustrated in FIG. 2. Time period A is when the charging capacitor 31 is being charged. Time period B identifies the period in which the capacitor 31 is discharging through rectifier 33, providing a low impedance discharge path therethrough. Period C is the period during which the coil 32 is acting as a current generator to sustain current in the same direction through low impedance path including rectifier 33. During the period C the capacitor 31 is being charged in the opposite direction to the polarity of charging effected by the constant current source. Period D which commences with the shut off or non-conduction of the rectifier 33, is the period when the capacitor 31 is discharging the voltage applied to it by the coil 32. When this capacitor is fully discharged through the constant current source it will again be recharged by the constant current source to start another cycle.

FIG. 2, curve $b$ illustrates the sum of the feedback through resistor 45 and winding 73 which are added to a portion of the trigger signal $e_a$ across the integrating capacitor 52. As set forth above the feedback through resistor 45 and winding 73 is substantially a D.C. level. The waveform shown in FIG. 2, curve $b$ is similar to the waveform of the trigger signal $e_b$. The potential at point B, however, has a D.C. level which is dependent upon the feedback through resistor 45 and winding 73. Hence, when the 60 cycle signal is reflected through the secondary 73, the D.C. reference level will tend to change by this modulation to thereby tend to effect a change in frequency of the power supply. It has been discovered that when this low frequency voltage is applied to the feedback loop including resistor 45 and winding 73, that regardless of where the center or main frequency of the generator is located on the characteristic curve of the transducer, as illustrated in FIG. 3, the power supply will have the same frequency or substantially the same frequency as the effective resonant frequency of the transducer, a very large portion of the time so as to provide a maximum transfer of energy. That is when the control 70 is effective to pass the frequency of the power supply through one of the resonant loops shown in FIG. 3, the tracking action effected by the phase shifting network 20 will be effective to clamp the frequency of the power supply closely to the frequency of the transducer for a large portion of the time, and when the frequency of the power supply is switched between one resonant loop and the other or is located at the top of one of the resonant loops, the transfer of the frequency of the device through the range of non-resonant frequencies will occur during only a small portion of operating time of the device. The feedback control 70 tends to swing the frequency of the generator about a center frequency and a certain frequency band on one side and on the other side of the center frequency. If the transducer 21 has a resonant frequency approximately equal to the center frequency, it has been discovered that the phase shifting network 20 will be effective to hold the frequency of the generator on or very close to the resonant frequency of the transducer and the feedback control 70 is not effective to move the frequency of the generator out of this resonant section. If, however, the center frequency is outside the lower portion of one of the resonant loops, the feedback control 70 will be effective to sweep the frequency of the generator into the bottom of one of the resonant loops for the tracking of the phase shifting network 20 responds to hold the unit in this resonant section a large portion of the operating time with the time taken to shift from one resonant to another representing only a small portion of the operating time. The embodiment of the invention illustrated in FIG. 1 has been operated and tested with the following component values:

| Item: | Description |
|---|---|
| 11 | W341H bridge. |
| 12 | 15 mh. |
| 14 | 12 mh. |
| 13 | 1000 fd. |
| 22 | .09 f. |
| 21 | .64 mh. |
| 31 | .66 f. |
| 32 | 52 mh. |
| 72 | 10,000 ohms. |
| 73 | 4000 ohms. |
| 45 | 10 kilo-ohms. |
| 51 | 7.5 kilo-ohms. |
| 53 | 1000 f. |
| 52 | .01 f. |
| 47 | 10K. |
| 48 | 50 v. diode W341. |
| 49 | OMC 37 diode. |
| 33 | STCR24C. |
| 61 | TM41. |
| 62 | 100 ohms. |

Transformer 71 was a 10/4 stepdown transformer with the secondary 73 having an inductance of 15 millihenries so that the impedance thereof varies between zero ohms and 2.5 kilo-ohms at a 120 cycle rate.

The transducer employed was a magnetostrictive transducer similar to the transducer disclosed in the above mentioned application Serial No. 722,817 with the coil 21 being the driving coil of the magnetostrictive transducer.

The results of these tests were:

(1) As the loading is changed, the track circuit maintained the resonant frequency within 90% of the sweep cycle.

(2) A constant power input to the load is maintained within ±10%.

While I have shown a particular embodiment of my invention it will of course be understood that I do not wish to be limited thereto since many modifications or circuit arrangements may be made without departing from the spirit and scope of the invention, and I therefore contemplate by the appended claims to cover any such modifications as wall within the true scope of my invention.

What I claim as new and desire to secure by Letters Patent of the United States is:

1. In combination a vibrating transducer including a reactance element, an LC network, a source of direct current for charging said network, a phase shifting network including said transducer reactance element operatively connected to said LC network for producing a trigger signal having a frequency dependent upon the equivalent electrical characteristic of said transducer, switch means operably connected to both said networks and responsive to said trigger signal to periodically provide a discharge path for said LC network, and means for automatically varying the frequency of said trigger signal.

2. A power supply for a vibrating transducer including a reactance element having a resonant frequency functionally related to the load to be driven thereby comprising, in combination; a source of direct current; an LC network; means for connecting the transducer reactance element and LC network in circuit combination to said source of direct current; switching means; means for providing trigger signals to said switching means having a direct current reference level and having a frequency dependent on the equivalent electrical characteristics of said transducer; and means for periodically varying the direct current reference level of said trigger signal; said switching means being responsive to a trigger signal of predetermined magnitude for controlling current in said LC network and said transducer.

3. A power supply for vibrating a transducer including a reactance element comprising, in combination; an LC network; a source of direct current for charging said network; a phase shifting network including said transducer reactance element; said phase shifting network operatively connected to said LC network for producing a trigger signal having a frequency dependent on the equivalent electrical characteristic of said transducer; switching means for controlling current in said LC network; feedback means operably connected to said LC network for producing a varying feedback signal; summing means for adding a portion of said trigger signal and said varying feedback signal; and means for applying the output of said summing means to said switch means to render said switch means conductive.

4. A power supply for vibrating a transducer including a reactance element comprising, in combination; an LC network; a source of direct current for charging said network; a phase shifting network including said transducer reactance element; said phase shifting network operatively connected to said LC network for producing a trigger signal having a frequency dependent on the equivalent electrical characteristic of said transducer; switching means operably connected to control current in said LC network and said transducer; summing means; feedback means including winding means for connecting a signal from said LC network back to said summing means; another winding means inductively coupled to said winding means for applying an alternating current voltage thereto for periodically varying the feedback signal to said summing means; said summing means adding a portion of said trigger signal and said varying feedback signal; and means for applying the output of said summing means to said switch means to render said switch conductive when the sum exceeds a predetermined magnitude.

5. A power supply for a vibrating transducer including a reactance element having a resonant frequency functionally related to the load to be driven thereby comprising, in combination; a source of direct current; an LC network; means for connecting the transducer reactance element and LC network in circuit combination to said source of direct current; switching means responsive to a trigger signal for controlling current in said LC network and said transducer; means for tracking the resonant frequency of the transducer for providing trigger signals to said switching means of substantially the same frequency; and means for sweeping the trigger signals to said switching means over a predetermined range to assist the means for tracking to find the resonant frequency.

6. A power supply for vibrating a transducer including a reactance element comprising, in combination; an LC network; a source of direct current for charging said network; a phase shifting network including said transducer reactance element; said phast shifting network operatively connected to said LC network for producing a trigger signal having an ultrasonic frequency dependent on the equivalent electrical characteristic of said transducer; switch means operably connected to control current in said LC network and transducer; summing means; feedback means operably connected to said LC network for providing an ultrasonic feedback signal to said summing means; said feedback means including means for modulating the ultrasonic frequency with a substantially lower frequency signal; said summing means adding a portion of said trigger signal and said modulated ultrasonic feedback signal; and means for applying the output of said summing means to said switch means to render said switch means conductive when the sum exceeds a predetermined magnitude.

References Cited in the file of this patent

UNITED STATES PATENTS

| | | |
|---|---|---|
| 2,287,223 | Baird | June 23, 1942 |
| 2,287,880 | Hittson | June 30, 1942 |
| 2,322,217 | Baird | June 22, 1943 |
| 2,889,460 | Ehret | June 2, 1959 |
| 2,939,064 | Momberg | May 31, 1960 |
| 2,995,689 | Scarpa | Aug. 8, 1961 |
| 3,040,224 | Piltz et al. | June 19, 1962 |